United States Patent
Song et al.

(10) Patent No.: US 11,383,162 B2
(45) Date of Patent: Jul. 12, 2022

(54) VOICE SKILL GAME EDITING METHOD, APPARATUS, DEVICE AND READABLE STORAGE MEDIUM

(71) Applicant: BAIDU ONLINE NETWORK TECHNOLOGY (BEIJING) CO., LTD., Beijing (CN)

(72) Inventors: Kaisheng Song, Sunnyvale, CA (US); Xuening Deng, Beijing (CN); Yaowen Qi, Beijing (CN); Jiale Wang, Beijing (CN); Huan Tang, Beijing (CN); Liangcheng Wu, Beijing (CN); Lei Zhong, Sunnyvale, CA (US); Peng Yuan, Beijing (CN); Linlin Zhao, Beijing (CN); Sen Li, Beijing (CN)

( * ) Notice: Subject to any disclaimer, the term of this patent is extended or adjusted under 35 U.S.C. 154(b) by 99 days.

(21) Appl. No.: 16/911,542

(22) Filed: Jun. 25, 2020

(65) Prior Publication Data

US 2020/0406137 A1 Dec. 31, 2020

(30) Foreign Application Priority Data

Jun. 28, 2019 (CN) .......................... 201910580306.1

(51) Int. Cl.
*G06F 3/0481* (2022.01)
*G06F 3/0484* (2022.01)
(Continued)

(52) U.S. Cl.
CPC .......... *A63F 13/424* (2014.09); *A63F 13/215* (2014.09)

(58) Field of Classification Search
CPC ....... A63F 13/47; A63F 13/60; G06F 30/0481
See application file for complete search history.

(56) References Cited

U.S. PATENT DOCUMENTS 10,551,993 B1 * 2/2020 Sanocki ................. G06F 3/017

FOREIGN PATENT DOCUMENTS

| CN | 108283803 A | 7/2018 |
|---|---|---|
| CN | 108829654 A | 11/2018 |

(Continued)

OTHER PUBLICATIONS

Let's make your own super-haha game using super-moe images, Netrunner, Soft Bank Publishing, 2005, pp. 38-41.

(Continued)

*Primary Examiner* — Lawrence S Galka
(74) *Attorney, Agent, or Firm* — Dilworth IP, LLC (57) ABSTRACT

Provided are a voice skill game editing method, an apparatus, a device and a readable storage medium, which involve displaying a plurality of node elements having a hierarchical relationship and a cascading element for connecting a parent node and a child node in a node editing area of a user editing interface; acquiring voice scenario information configured by a user for the node elements in an element configuration area of the node elements when the node elements are determined as in an active state; acquiring voice skill control information configured by the user for the cascading element in an element configuration area of the cascading element when the cascading element is determined as in an active state; and determining, according to the hierarchical relationship corresponding to the node elements and the voice skill control information configured for the cascading element, game logic between the voice scenario information.

11 Claims, 5 Drawing Sheets

(51) Int. Cl.
*A63F 13/424* (2014.01)
*A63F 13/215* (2014.01)

(56) References Cited

FOREIGN PATENT DOCUMENTS

| | | |
|---|---|---|
| CN | 108970117 A | 12/2018 |
| JP | H10154070 A | 6/1998 |
| JP | 2001129261 A | 5/2001 |
| JP | 2004054300 A | 2/2004 |
| JP | 2016097124 A | 5/2016 |
| JP | 2018032330 A | 3/2018 |
| JP | 2018512186 A | 5/2018 |

OTHER PUBLICATIONS

First Office Action in JP Patent Application No. 2020077851 dated May 11, 2021.
Strange Talk-Story Editor Instructions, you can master this.., One Dream Jianghu Comprehensive, https://www.taptap.com/topic/4906935, Jan. 31, 2019, TapTap, pp. 1-11.
First Office Action in CN Patent Application No. 201910580306.1 dated May 16, 2022.

* cited by examiner

VOICE SKILL GAME EDITING METHOD, APPARATUS, DEVICE AND READABLE STORAGE MEDIUM

CROSS-REFERENCE TO RELATED APPLICATION

This application claims priority to Chinese Patent Application No. 201910580306.1, filed on Jun. 28, 2019, which is hereby incorporated by reference in its entirety.

TECHNICAL FIELD

The present disclosure relates to game editing technology, and in particular, to a voice skill game editing method, an apparatus, a device and a readable storage medium.

BACKGROUND

With the development of the game industry, more and more games are beginning to appear. The generation of the game requires not only the design of various play methods and a logic in the game, but also a lot of code support.

The existing game editing usually require to achieve editing of the various game levels by encoding the code. And when it needs to update the game logic, it needs to adjust the involved code part.

A large number of code programming operations limit an expansion extent of game content. Moreover, usually game editing have to be done by concerted efforts of a professional game production team. The game creation is inefficient, and it is also difficult to popularize the game editing among users. The existing game editing method is cumbersome and inefficient in operation.

SUMMARY

The present disclosure provides a voice skill game editing method, an apparatus, a device and a readable storage medium. Also provided is a programming-free visual voice skill game editing method, which simplifies user operations and improves user's game editing efficiency.

According to a first aspect of the present disclosure, a voice skill game editing method is provided, including:

displaying a plurality of node elements having a hierarchical relationship and a cascading element for connecting a parent node and a child node in a node editing area of a user editing interface;

acquiring voice scenario information configured by a user for the node elements in an element configuration area of the node elements when it is determined that the node elements are in an active state;

acquiring voice skill control information configured by the user for the cascading element in an element configuration area of the cascading element when it is determined that the cascading element is in an active state; and determining, according to the hierarchical relationship corresponding to the node elements and the voice skill control information configured for the cascading element, game logic between the voice scenario information to obtain a voice skill game.

According to a second aspect of the present disclosure, a voice skill game editing apparatus is provided, including:

a display interacting module, configured to display a plurality of node elements having a hierarchical relationship and a cascading element for connecting a parent node and a child node in a node editing area of a user editing interface;

a node editing module, configured to acquire voice scenario information configured by a user for the node elements in an element configuration area of the node elements when it is determined that the node elements are in an active state;

a cascading element editing module, configured to acquire voice skill control information configured by the user for the cascading element in an element configuration area of the cascading element when it is determined that the cascading element is in an active state; and a processing module, configured to determine, according to the hierarchical relationship corresponding to the node elements and the voice skill control information configured for the cascading element, game logic between the voice scenario information to obtain a voice skill game.

According to a third aspect of the present disclosure, a device is provided, including: a memory, a processor, and a computer program, where the computer program is stored in the memory, and the processor runs the computer program to perform the voice skill game editing method according to the voice skill game editing method according to the first aspect of the present disclosure and various possible designs thereof.

According to a fourth aspect of the present disclosure, a readable storage medium is provided, storing therein a computer program which, when executed by a processor, is configured to implement the voice skill game editing method according to the first aspect of the present disclosure and various possible designs thereof.

According to the voice skill game editing method, the apparatus, the device and the readable storage medium provided by the prevent disclosure, the method enables: displaying a plurality of node elements having a hierarchical relationship and a cascading element for connecting a parent node and a child node in a node editing area of a user editing interface; acquiring voice scenario information configured by a user for the node elements in an element configuration area of the node elements when it is determined that the node elements are in an active state; acquiring voice skill control information configured by the user for the cascading element in an element configuration area of the cascading element when it is determined that the cascading element is in an active state; and determining, according to the hierarchical relationship corresponding to the node elements and the voice skill control information configured for the cascading element, game logic between the voice scenario information to obtain a voice skill game. The method allows for a programming-free game editing, and an independent editing of scenario and game logic control through independently editing the node elements and the cascading element, thereby simplifying the operation difficulty of the voice skill game editing, and improving the efficiency of the voice skill game editing.

DESCRIPTION OF EMBODIMENTS

In order to make the objects, technical solutions and advantages of embodiments of the present disclosure more clear, the technical solutions in the embodiments of the present disclosure will be clearly and completely described in combination with the drawings in the embodiments of the present disclosure. It is apparent that the described embodiments are merely part of the embodiments of the present disclosure, but not all of the embodiments. All other embodiments obtained by those skilled in the art based on the embodiments of the present disclosure without any creative effort are within the protection scope of the present disclosure.

It should be understood that in various embodiments of the present disclosure, the sequence numbers of various processes do not imply a sequence of execution. Rather, the sequence of execution of the various processes should be determined by their functions and internal logics, and should not constitute any limitation on the implementation process of the embodiments of the present disclosure.

It should be understood that in the present disclosure, "including" and "having", and any variations thereof, are intended to cover non-exclusive inclusions. For example, a process, method, system, product, or device that "includes" a series of steps or units is not necessarily limited to those steps or units that are explicitly listed, but may include other steps or units that are not explicitly listed but nonetheless inherent to such process, method, product, or device.

It should be understood that in the present disclosure, "a plurality" refers to two or more. "And/or" is merely an association relationship describing associated objects, indicating that there may be three relationships. For example, A and/or B may indicate that A exists separately, A and B exist simultaneously, and B exists separately. The character "/" generally indicates that contextual objects have an "or" relationship. "Including A, B, and C" and "including A, B, C" refer to that A, B, and C are all included, and "including A, B, or C" refers to that one of A, B, and C is included. "Including A, B, and/or C" refers to that any one or two or three of A, B, and C is/are included.

It should be understood that in the present disclosure, "B corresponding to A", "B corresponding to A", "corresponding A to B" or "corresponding B to A" refer to that B is associated with A, and B may be determined according to A. Determining B from A does not mean that B is only determined from A. Rather, B can also be determined from A and/or other information. The match between A and B is that a similarity between A and B is greater than or equal to a preset threshold.

Depending on the context, "if" as used herein may be interpreted as "when" or "while" or "in response to determining" or "in response to detecting".

The technical solutions of the present disclosure will be described in detail below with specific embodiments. The following specific embodiments may be combined with each other, and same or similar concepts or processes may be omitted in some embodiments.

In the existing game editing method, the editor can achieve editing of a game by directly programming a large number of codes, which limits an expansion extent of a game content. For example, when modifying a game scenario, it needs to modify underlying codes involved, which may lead to instability of the overall game. The existing game editing methods are cumbersome and inefficient in operation.

In order to solve the problem in the existing game editing method, an embodiment of the present disclosure provides a voice skill game editing method, which, by providing a user with a plurality of node elements having a hierarchical relationship and a cascading element for connecting a parent node and a child node, achieves a programming-free and visualized game editing. Voice scenario information is configured by the node elements, and voice skill control information is configured by the cascading element, thus realizing an independent editing of the scenario and control, thereby further improving the efficiency and expandability of the game editing.

Figure 1:
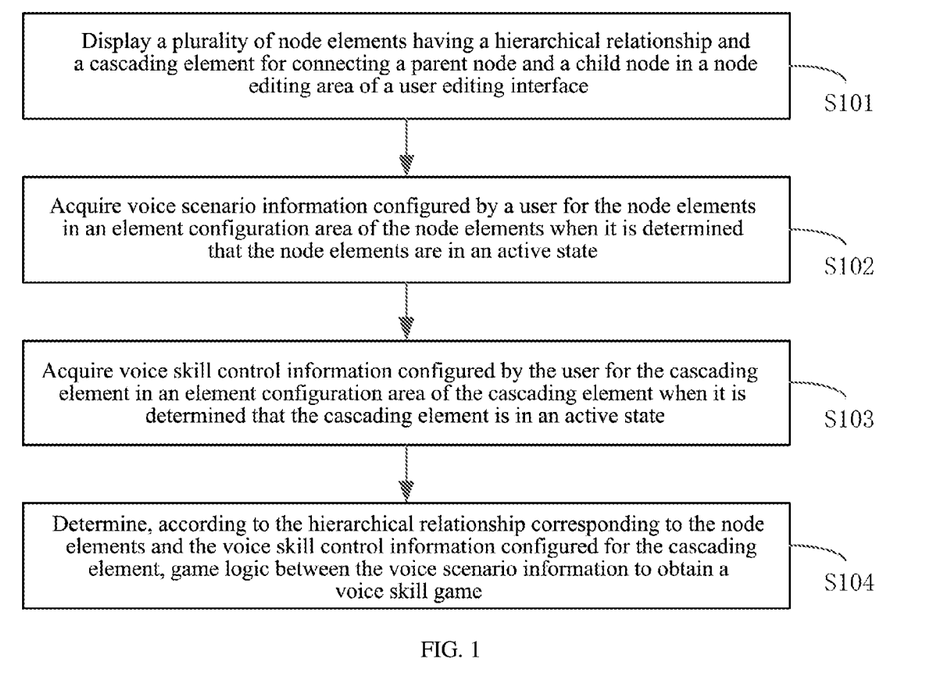
FIG. 1 is a schematic flowchart of a voice skill game editing method according to an embodiment of the present disclosure.

FIG. 1 is a schematic flowchart of a voice skill game editing method according to an embodiment of the present disclosure. An execution body of the method shown in FIG. 1 may be software and/or hardware. The execution body is, for example, a voice skill game editing apparatus, which may be, for example, various types of user terminals or distributed servers, or may be editing software provided in a user terminal or a distributed server. The method shown in FIG. 1 includes steps S101 to S104, as follows:

S101. Display a plurality of node elements having a hierarchical relationship and a cascading element for connecting a parent node and a child node in a node editing area of a user editing interface.

Figure 2:
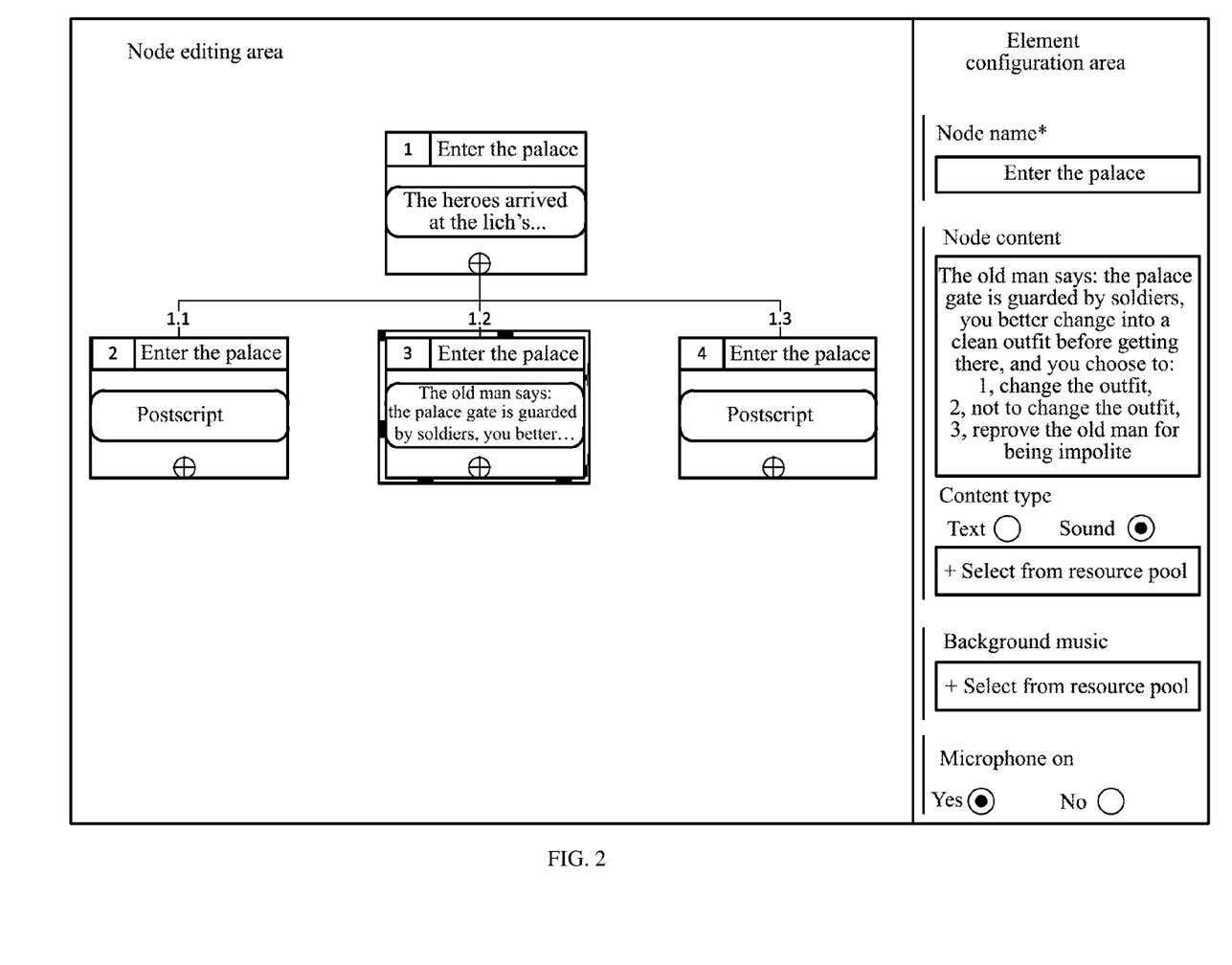
FIG. 2 is a schematic diagram of a user editing interface of a voice skill game editing according to an embodiment of the present disclosure.

For example, the voice skill game editing apparatus may display a plurality of options to the user, and display the node editing area to the user when the user selects a game scriptbook editing option. Reference is now made to FIG. 2, which is a schematic diagram of a user editing interface for voice skill game editing according to an embodiment of the present disclosure. A plurality of node elements established according to user operations are displayed in the node editing area, and the node elements are associated with each other in a tree structure. That is, each node element is a parent node or a child node of some other node element. The hierarchical relationship between the node elements forms a logical structure of the game, and each node element is used to provide the user with a scenario content input interface. It can be understood that each node element can be used to configure dialogue information of a non-player character, an images of the non-player character, a background image, a background music, or the like in a certain scene in the game. For example, for the four node elements shown in FIG. 2, each node element enables setting of scenario information such as a node name (such as a chapter name corresponding to the scenario), a node content, a background music and/or the like, as well as information such as whether to turn on a microphone, content to be shown in different types of devices, or the like. The node element may also have a node element identifier to help the voice skill game editing apparatus distinguishing different node elements, as can be seen in the labels in upper left corners of the node elements shown in FIG. 2. In some embodiments, the node editing area may also enlarge or reduce the tree structure composed of the node elements and the cascading element in response to a user's scaling operation.

The above cascading element may be an interface for providing a hand over rule setting between node elements to which it is connected. An example may be a condition for a parent node to hand over to a child node and how information is changed. For example, the cascading elements 1.1, 1.2, and 1.3 shown in FIG. 2 may be configured to respectively hand over to a scenario corresponding to one of three different nodes elements 2, 3, and 4 when the virtual character is detected to travel leftward, straight, and rightward. Or, when the user controls the virtual character to trigger an award scenario corresponding to a node element, the cascading element further enables setting of a determination about whether current attribute information of the virtual character satisfies a requirement of the award scenario, as well as the feedback information corresponding to when the requirement is satisfied or not satisfied, respectively.

In some embodiments, the voice skill game editing apparatus also provides functions for expanding, deleting, and/or inserting node elements, and various implementable editing modes of the node elements are exemplified below in combination with the drawings and specific embodiments.

Figure 3:
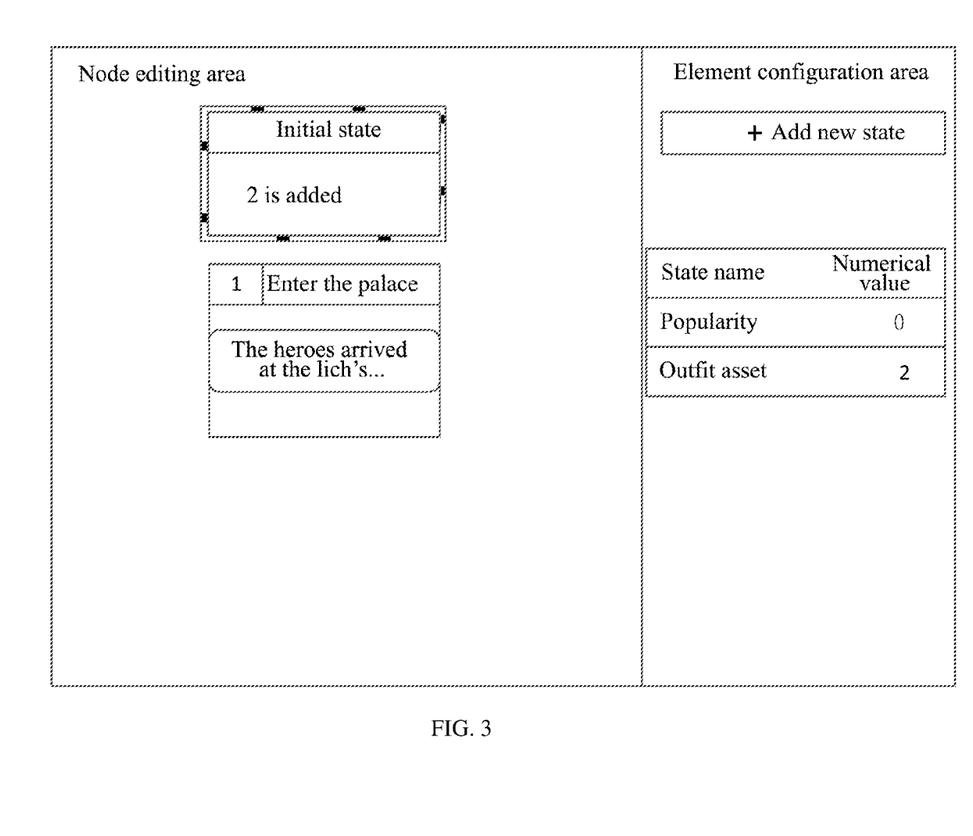
FIG. 3 is a schematic diagram of another user editing interface of voice skill game editing according to an embodiment of the present disclosure.

In an embodiment, before displaying the plurality of node elements having the hierarchical relationship and the cascading element for connecting a parent node and a child node, an initialization setting process of the plurality of node elements having the hierarchical relationship may also be performed first. For example, the voice skill game editing apparatus may firstly display a node element as a root node in the node editing area. Reference is made to FIG. 3, which is a schematic diagram of a user editing interface for another voice skill game editing according to an embodiment of the present disclosure. As shown in FIG. 3, the node element as the root node includes an expanded control for expanding a node, and the node element itself is also a control for triggering an element configuration area. For example, the voice skill game editing apparatus may, when detecting a user click on the expanded control, creates a corresponding number of node elements under the node element as the root node according to the number of user clicks, and the created node elements are all child nodes of the root node. Specifically, the voice skill game editing apparatus may generate under the node element as the root node a new node element taking the root node as a parent node, and a cascading element connecting the node element as the root node and the new node element, according to a node expansion operation input by the user to the node element as the root node, so as to form the hierarchical relationship between the node elements. The hierarchical relationship shown in FIG. 3 formed by the node elements after the node expansion operation can be seen by a reference to the tree structure shown in FIG. 2.

Figure 4:
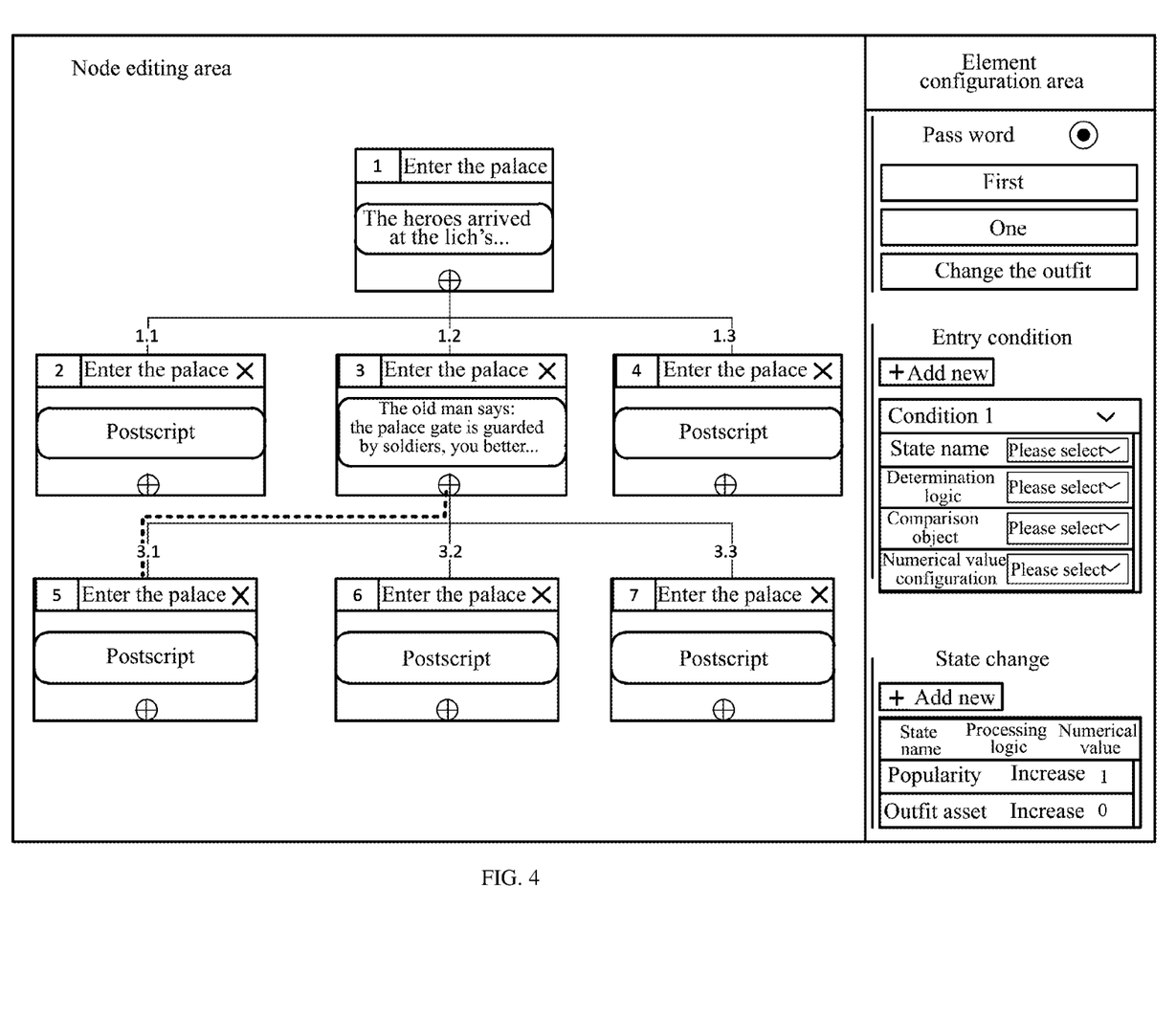
FIG. 4 is a schematic diagram of yet another user editing interface of voice skill game editing according to an embodiment of the present disclosure.

In an embodiment, after the tree structure shown in FIG. 2 is formed, the hierarchical relationship of the node elements may be continuously expanded or deleted. Reference is made to FIG. 4, which is a schematic diagram of a user editing interface for yet another voice skill game editing according to an embodiment of the present disclosure. For example, the user triggers a node expanded control to implement input of a node expansion operation. The voice skill game editing apparatus generates under the node element corresponding to the node expansion operation a new node element, taking the node element corresponding to the node expansion operation input by the user as a parent node, and generates a cascading element connecting the node element corresponding to the node expansion operation and the new node element according to the node expansion operation. The nodes are expanded according to the hierarchical relationship shown in FIG. 2, that is, three child nodes are expanded for the node element 2, arriving at the hierarchical relationship of seven node elements as shown in FIG. 4.

As shown in FIG. 4, a node deletion control is also included in the node elements. The user can click on the X node deletion control as shown in FIG. 4 to implement a node deletion operation. The voice skill game editing apparatus deletes a node element corresponding to the node deletion operation input by the user, as well as all node elements and cascading elements in all hierarchies under the node element according to the node deletion operation. For example, if the user triggers a node deletion control of the node element 3 shown in FIG. 4, the voice skill game editing apparatus deletes the node elements 3, 5, 6, and 7.

In an embodiment, after the plurality of node elements having the hierarchical relationship and the cascading element for connecting a parent node and a child node in the node editing area of a user editing interface are displayed, a depth of the node elements in the tree structure may also be increased, which can be understood as inserting a intermediate node between a parent node and its child node to increase the depth of the parent node. For example, the voice skill game editing apparatus generates a new node element between at least two node elements corresponding to a node insertion operation input by the user and cascading elements connecting the at least two node elements and the new node element according to the node insertion operation, where the new node element is an intermediate node in a node branch including the at least two node elements.

Through the above various editing to the node elements and the hierarchical relationship structure, the node elements can be visually added and/or deleted as needed when modifying the scenario, thereby improving the game editing efficiency.

S102. Acquire voice scenario information configured by a user for the node elements in an element configuration area of the node elements when it is determined that the node elements are in an active state.

The node elements themselves can act as a control that, when it detects that the user activates the node elements in a manner such as a click operation, switches the node elements to an active state and highlights the node elements that are in the active state. The activation state can be understood as a state in which a node is selected by the user as a currently edited node element. When the node elements are in the active state, the voice skill game editing apparatus displays the element configuration area of the node elements to the user, which can be seen as the element configuration area shown in the right portion of FIG. 2. The voice skill game editing apparatus acquires the voice scenario information configured by the user for the node elements in the element configuration area of the node elements according to input and/or selection operation of the user on the element configuration area.

In some embodiments, the voice scenario information may, for example, include: voice resource information and voice input control information. A semantic corresponding to the voice resource information is a scenario content of the node elements. The voice skill game editing apparatus displays a control for configuring the voice resource information and a control for configuring the voice input control information in the element configuration area of the node elements when it is determined that the node elements are in the active state. The user can operate on the controls in the element configuration area to configure the node elements. The voice skill game editing apparatus acquires the voice resource information and the voice input control information configured for the node elements that are in the active state according to operations of the user on the control for configuring the voice resource information and the control for configuring the voice input control information.

For example, the scenario content corresponding to the activated node element 3 as shown in FIG. 2 is a dialogue of a non-player character, and the user can configure the node content as "The old man says: the palace gate is guarded by soldiers. You better change into a clean outfit before getting there, and you choose to: 1, change the outfit, 2, not to change the outfit, 3, reprove the old man for being impolite". Thus, the user can upload the dialogue content in the game design resource in advance as voice resource information: "The old man says: the palace gate is guarded by soldiers, you better change into a clean outfit before getting there, and you choose to: 1, change the outfit, 2, not to change the outfit, 3, reprove the old man for being impolite". When configuring the voice resource information of the node, the content type may be set to be "sound effect", and a storage path of a voice file corresponding to "The old man says: the palace gate is guarded by soldiers, you better change into a clean outfit before getting there, and you choose to: 1, change the outfit, 2, not to change the outfit, 3, reprove the old man for being impolite" is extracted from the pre-stored game design resource, and is associated with the node element 3. In the element configuration area corresponding to the node element 3, it is also possible to set the voice input control information, for example, information about whether to turn on the microphone. For example, if the user choose to turn on the microphone for the option of whether to turn on the microphone, it is determined that the node element 3 will monitor a command input by the game player while playing the voice "The old man says: the palace gate is guarded by soldiers, you better change into a clean outfit before getting there, and you choose to: 1, change the outfit, 2, not to change the outfit, 3, reprove the old man for being impolite". There are three child nodes, i.e. node elements 5, 6, and 7, under the node element 3, which correspond to voice commands input 3 by the game player, respectively.

S103. Acquire voice skill control information configured by the user for the cascading element in an element configuration area of the cascading element when it is determined that the cascading element is in an active state.

For example, the cascading element itself can be a control that is highlighted when the cascading element is selected by the user and displays the element configuration area of the cascading element to the user. The voice skill game editing apparatus acquires the voice skill control information configured by the user for the cascading element in the element configuration area of the cascading element according to input and/or selection operation of the user in the element configuration area of the cascading element.

For example, the voice skill control information includes: a voice triggering rule, a child node hand over determining rule and a virtual character attribute updating rule. The voice skill game editing apparatus displays a control for configuring the voice triggering rule, a control for configuring the child node hand over determining rule and a control for configuring the virtual character attribute updating rule preset for the cascading element in the element configuration area of the cascading element when it is determined that the cascading element is in the active state, where a processing result of the voice triggering rule is trigger information of the child node hand over determining rule, and a processing result of the child node hand over determining rule is trigger information of the virtual character attribute updating rule.

These controls may be, for example, controls associated with the game design resource, for the user to select required resources in a preset game design resource and associate the resources with the cascading element. Or, the controls may be controls that receive user input information, such as input box, numerical options, or the like. The voice skill game editing apparatus acquires the voice triggering rule, the child node hand over determining rule and the virtual character attribute updating rule configured for the cascading element that is in the active state, respectively, according to operations of the user on the control for configuring the voice triggering rule, the control for configure the child node hand over determining rule, and the control for configuring the virtual character attribute updating rule.

For example, the node element 5, which is a child node of the node element 3, may be a scenario configured to correspond to the option "1, change the outfit" in the above example. Then, in the cascading element 3.1 between the node element 3 and the node element 5, the user can select the "Pass word" shown in FIG. 4, which indicates that there will be a pass word, and set password information to be "first" and "one" and "change the outfit". Thus, the processing of the configuration of the cascading element 3.1 can be performed when the game detects that the selecting voice spoken by the player-controlled virtual character matches any of the password information.

In some embodiments, the control for configuring the voice triggering rule is associated with an output interface of a preset natural language processing model, and an input interface of the natural voice processing model is associated with a preset game language input interface. It can be understood that, during the game, the user inputs a voice in a corresponding scenario of the current node element. The preset natural language processing model first extracts user semantic information, then it is determined whether the extracted user semantic information satisfies the voice triggering rule configured in the cascading element. If yes, the process is handed over to the processing logic corresponding to the corresponding cascading element, and continues to determine whether handing over to the scenario of the child node is possible according to the child node hand over determining rule. Specifically, for example, the voice skill game editing apparatus acquires password information according to the operation of the user on the control for configuring the voice triggering rule; and then acquires the voice triggering rule configured for the cascading element that is in the active state according to the password information, where the voice triggering rule defines comparing the password information with an output content of the natural language processing model, and triggering the child node hand over determining rule when the comparison produces a match. In the example shown in FIG. 4, for example, assuming that the player issues a voice "first" to control the virtual character to choose to change outfit in the game, then the cascading element 3.1 is triggered. Asset state of the virtual character is assessed according to the child node hand over determining rule "Entry condition" configured in the cascading element 3.1.

For example, in FIG. 4, status name is selected to be "Outfit asset", the determination logic is selected to be "Greater than or equal to", the comparison object is selected to be "Fixed value", and the numerical value setting is selected to be "2". If a corresponding value of the outfit asset of the virtual character is 2, then the entry condition is satisfied. Thus, the "Popularity" of the virtual character is increased by one according to a rule configured by the user in the "State change" shown in FIG. 5. The condition "the scenario after changing outfit" of the node element 5 is handed over to.

For another example, in FIG. 4, the state name may also be "Asset state", the determination logic is "Includes an outfit", the comparison object is "state information", and the numerical value configuration is left non-configurable. If the "Asset state" of the virtual character is "Shoes, outfit, books", then the entry condition is satisfied, and the "Popularity" of the virtual character is increased by one according to the rule configured by the user in the "State change" shown in FIG. 5. The condition "The scenario after changing outfit" of the node element 5 is handed over to.

An editable content provided to the user by the control for the child node transfer determining rule and the control for configuring the virtual character attribute updating rule is generally related to the attribute of the virtual character. The virtual character attribute information that can be changed should be preset for the virtual character at the time of initialization. Continuing on FIG. 3, the node editing area may further include an initial state element. An element configuration area of the initial state element is shown in the right portion of FIG. 3. In the element configuration area of the initial state element shown in FIG. 3, an initial state increasing control and a state configuration control are displayed to the user. The user increases a configurable initial state by clicking on the initial state increasing control, and configures names and values of various initial states by clicking on the state configuration control. For example, before voice skill control information configured by the user for the cascading element in the element configuration area of the cascading element is acquired when it is determined that the cascading element is in an active state, the voice skill game editing apparatus further performs a state initialization process for the virtual character. For example, virtual character attribute information configured by the user for the initial state element in the element configuration area of the initial state element is acquired when it is determined that the cascading element is in the active state.

Correspondingly, before the step S103, the voice skill game editing apparatus further determines the control for configuring the child node hand over determining rule and the control for configuring the virtual character attribute updating rule according to the virtual character attribute information configured for the initial state element. For example, if the initial state element configures that, as shown in FIG. 3, the attribute information of the virtual character includes "popularity" and "Outfit assets". Then, if the player selects "3, reprove the old man for being impolite" in the scenario corresponding to the node element 3 shown in FIG. 2, the "entry condition" (not shown) corresponding to the cascading element 3.3 shown in FIG. 4 is triggered. The "entry condition" corresponding to the cascading element 3.3 shown in FIG. 4 is configured by the user to determine whether the numerical value corresponding to the "Outfit asset" is greater than or equal to 2, and after determining that it is indeed greater than or equal to 2, reduce the numerical value corresponding to "Popularity" by 1, and then hands over to the scenario corresponding to the node element 7.

S104. Determine, according to the hierarchical relationship corresponding to the node elements and the voice skill control information configured for the cascading element, game logic between the voice scenario information to obtain a voice skill game.

For example, when detecting that the user is performing an operation of saving the game, procedures such as resource loading, code testing or the like are performed according to codes corresponding to the node elements and codes corresponding to the cascading elements, and finally codes that have passed the test are compiled to obtain a voice skill game program.

According to the voice skill game editing method provided by the embodiment, by displaying a plurality of node elements having a hierarchical relationship and a cascading element for connecting a parent node and a child node in a node editing area of a user editing interface; acquiring voice scenario information configured by a user for the node elements in an element configuration area of the node elements when it is determined that the node elements are in an active state; acquiring voice skill control information configured by the user for the cascading element in an element configuration area of the cascading element when it is determined that the cascading element is in an active state; and determining, according to the hierarchical relationship corresponding to the node elements and the voice skill control information configured for the cascading element, game logic between the voice scenario information to obtain a voice skill game, a programming-free game editing is achieved, and an independent editing of scenario and game logic control is realized through an independent editing of the node elements and the cascading element, thereby simplifying the operation difficulty of the voice skill game editing, and improving the efficiency of the voice skill game editing.

In various embodiments described above, a process of managing a game design resource may also be included. For example, the voice skill game editing apparatus also displays a resource management control to the user in a resource management operation interface. The resource management control may be in various forms, for example, a batch uploading control. The present disclosure is not limited thereto. Rather, it may also be a resource management control that performs batch deletion and batch modification. The voice skill game editing apparatus batch receives, batch deletes, or batch modifies the game design resource according to an operation of the user on the resource management control, where the game design resource includes at least one of a picture resource, a text resource, an audio resource and an animation resource.

In the various embodiments described above, the voice skill game editing apparatus may also globally configure a game global parameter or a configuration item. For example, the voice skill game editing apparatus displays a global information configuration control to the user in a global setting interface. There may be a plurality of global information configuration controls. For example, the global information configuration control may perform a uniform configuration in advance on a default background image, a default title and a default scenario content of the node elements, and microphone on by default, etc., to reduce the user's workload in subsequent node editings. Moreover, settings for a game entering welcome interface and a game exiting interface can be configured by the global information configuration control. The voice skill game editing apparatus configures default information of the game global parameter or associate a game global configuration item with a default game design resource according to an operation of the user on the global information configuration control. The present embodiment sets a default content in the game editing by providing a global setting function to the user in the global setting interface, which reduces repetitive works for the user on the game editing, thereby improving the efficiency of the game editing.

Figure 5:
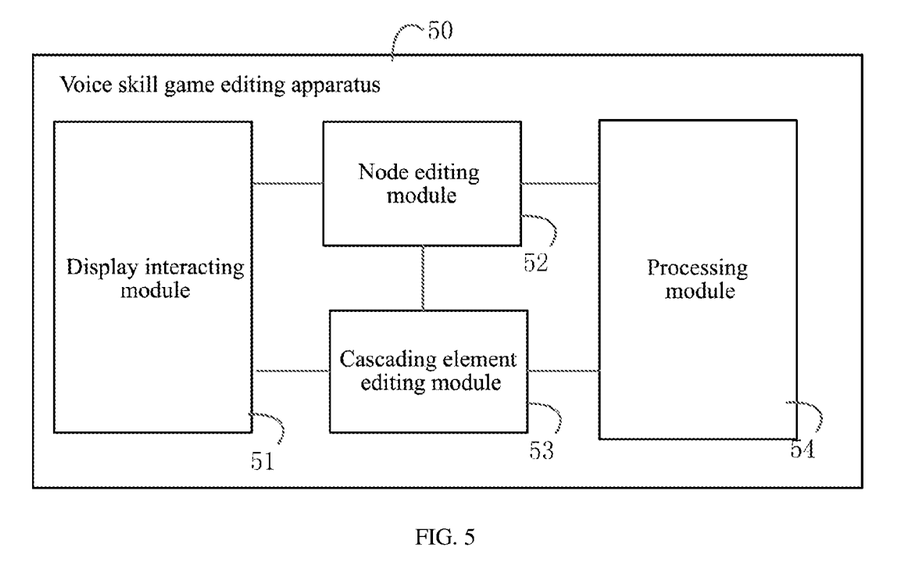
FIG. 5 is a schematic structural diagram of a voice skill game editing apparatus according to the present disclosure.

FIG. 5 is a schematic structural diagram of a voice skill game editing apparatus according to the present disclosure. The voice skill game editing apparatus 50 shown in FIG. 5 includes:

a display interacting module 51, configured to display a plurality of node elements having a hierarchical relationship and a cascading element for connecting a parent node and a child node in a node editing area of a user editing interface;

a node editing module 52, configured to acquire voice scenario information configured by a user for the node elements in an element configuration area of the node elements when it is determined that the node elements are in an active state;

a cascading element editing module 53, configured to acquire voice skill control information configured by the user for the cascading element in an element configuration area of the cascading element when it is determined that the cascading element is in an active state; and a processing module 54, configured to determine, according to the hierarchical relationship corresponding to the node elements and the voice skill control information configured for the cascading element, game logic between the voice scenario information to obtain a voice skill game.

The voice skill game editing apparatus of the embodiment shown in FIG. 5 is correspondingly used to perform the steps performed by the voice skill game editing apparatus in the method embodiment shown in FIG. 1. The implementation principle and technical effects are similar, and details will not be repeated herein again.

In an embodiment, the voice scenario information includes: voice resource information and voice input control information, where a semantic corresponding to the voice resource information is a scenario content of the node elements.

Correspondingly, the node editing module 52 is configured to display a control for configuring the voice resource information and a control for configuring the voice input control information in the element configuration area of the node elements when it is determined that the node elements are in the active state; and acquire the voice resource information and the voice input control information configured for the node elements that are in the active state according to operations of the user on the control for configuring the voice resource information and the control for configuring the voice input control information.

In an embodiment, the voice skill control information includes: a voice triggering rule, a child node hand over determining rule and a virtual character attribute updating rule.

Correspondingly, the cascading element editing module 53 is configured to display a control for configuring the voice triggering rule, a control for configure the child node hand over determining rule and a control for configuring the virtual character attribute updating rule preset for the cascading element in the element configuration area of the cascading element when it is determined that the cascading element is in the active state, where a processing result of the voice triggering rule is trigger information of the child node hand over determining rule, and a processing result of the child node hand over determining rule is trigger information of the virtual character attribute updating rule; and acquire the voice triggering rule, the child node hand over determining rule and the virtual character attribute updating rule configured for the cascading element that is in the active state, respectively, according to operations of the user on the control for configuring the voice triggering rule, the control for configure the child node hand over determining rule and the control for configuring the virtual character attribute updating rule.

In an embodiment, the node editing module 52 is further configured to, before displaying a plurality of node elements having a hierarchical relationship and a cascading element for connecting a parent node and a child node in a node editing area of a user editing interface, display a node element as a root node in the node editing area; and generate under the node element as the root node a new node element taking the root node as a parent node, and a cascading element connecting the node element as the root node and the new node element, according to a node expansion operation input by the user to the node element as the root node, so as to form the hierarchical relationship between the node elements.

In an embodiment, the node editing module 52 is further configured to, after displaying a plurality of node elements having a hierarchical relationship and cascading element for connecting a parent node and a child node in a node editing area of a user editing interface, generate under the node element a new node element taking a node element corresponding to a node expansion operation input by the user as a parent node and a cascading element connecting the node element corresponding to the node expansion operation and the new node element according to the node expansion operation corresponding to the node expansion operation; and delete a node element corresponding to a node deletion operation input by the user, as well as all node elements and cascading elements in all hierarchies under the node element according to the node deletion operation.

In an embodiment, the node editing module 52 is further configured to, after displaying a plurality of node elements having a hierarchical relationship and a cascading element for connecting a parent node and a child node in a node editing area of a user editing interface, generate a new node element between at least two node elements corresponding to a node insertion operation input by the user, and cascading elements connecting the at least two node elements and the new node element according to the node insertion operation, where the new node element is an intermediate node in a node branch including the at least two node elements.

In an embodiment, the node editing area further includes an initial state element.

Correspondingly, before the cascading element editing module 53 acquires voice skill control information configured by the user for the cascading element in an element configuration area of the cascading element when it is determined that the cascading element is in an active state, the node editing module 52 is further configured to: acquire virtual character attribute information configured by the user for the initial state element in an element configuration area of the initial state element when it is determined that the cascading element is in the active state; and determine the control for configure the child node hand over determining rule, and the control for configuring the virtual character attribute updating rule according to the virtual character attribute information configured for the initial state element.

In an embodiment, the control for configuring the voice triggering rule is associated with an output interface of a preset natural language processing model, and an input interface of the natural voice processing model is associated with a preset game language input interface.

Correspondingly, the cascading element editing module 53 is configured to acquire password information according to the operation of the user on the control for configuring the voice triggering rule; and acquire the voice triggering rule configured for the cascading element that is in the active state according to the password information, where the voice triggering rule defines: comparing the password information with an output content of the natural language processing model, and triggering the child node hand over determining rule when the comparison produces a match.

In an embodiment, the display interacting module 51 is further configured to display a resource management control to the user in a resource management operation interface; and batch receive, batch delete, or batch modify a game design resource according to an operation of the user on the resource management control, where the game design resource includes at least one of a picture resource, a text resource, an audio resource and an animation resource.

In an embodiment, the display interacting module 51 is further configured to display a global information configuration control to the user in a global setting interface; and configure default information of a game global parameter or associate a game global configuration item with a default game design resource according to an operation of the user on the global information configuration control.

Figure 6:
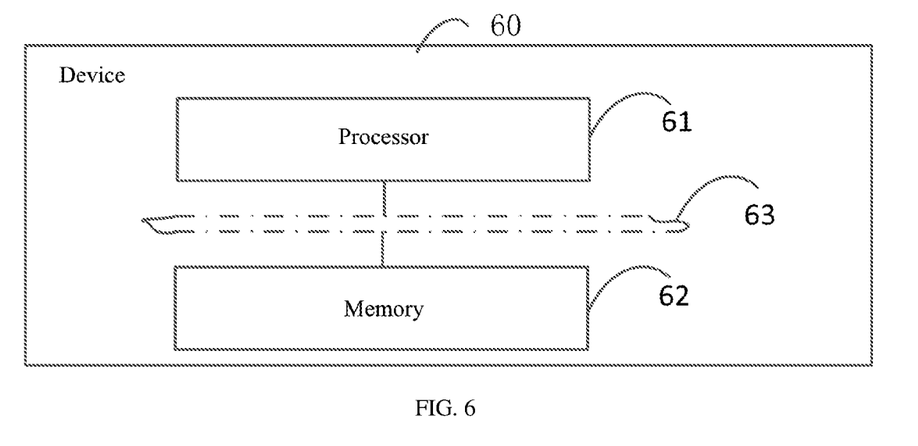
FIG. 6 is a schematic structural diagram of hardware of a device according to an embodiment of the present disclosure.

Referring to FIG. 6, which is a schematic structural diagram of hardware of a device according to an embodiment of the present disclosure, the device includes: a processor 61, a memory 62, and a computer program, where:

the memory 62 is configured to store the computer program, where the memory may be a flash memory (flash), and the computer program is, for example, an application, a function module, or the like that implements the above method; and the processor 61 is configured to execute the computer program stored in the memory to implement various steps performed by the voice skill game editing apparatus in the voice skill game editing method. Details may be found in the related description in the foregoing method embodiments.

In an embodiment, the memory 62 may be either stand-alone or integrated with the processor 61.

When the memory 62 is a unit independent from the processor 61, the device may further include:

a bus 63, configured to connect the memory 62 and the processor 61.

The present disclosure further provides a readable storage medium, where the readable storage medium stores therein a computer program which, when executed by the processor, is configured to perform the voice skill game editing method according to the various embodiments described above.

The readable storage medium may be a computer storage medium or a communication medium. The communication medium includes any medium that facilitates transfer of computer program from one location to another. The computer storage medium can be any available medium that can be accessed by a general purpose or special purpose computer. For example, the readable storage medium is coupled to a processor to enable the processor to read information from, and write information to, the readable storage medium. Of course, the readable storage medium may also be an integral part of the processor. The processor and the readable storage medium may be located in an application specific integrated circuit (ASIC). Additionally, the ASIC may be located in a user equipment. Of course, the processor and the readable storage medium may also exist as discrete components in a communication device. The readable storage medium may be a read only memory (ROM), a random access memory (RAM), a CD-ROM, a magnetic tape, a floppy disk, an optical data storage device, or the like.

The present disclosure also provides a program product, including execution instructions stored in a readable storage medium. At least one processor of a device can read the execution instructions from the readable storage medium to execute the execution instructions to cause the device to implement the voice skill game editing method according to the various embodiments described above.

In the embodiment of the device, it should be understood that the processor may be a central processing unit (CPU), or may be other general-purpose processor, digital signal processor (DSPs), application specific integrated circuit (ASIC), etc. The general purpose processor may be a microprocessor, or the processor may be any conventional processor, or the like. The steps of the method disclosed in combination with the present disclosure may be directly embodied as being accomplished by a hardware processor or by a combination of hardware and software modules in a processor.

Finally, it should be noted that the above embodiments are merely intended for illustrating rather than limiting the technical solutions of the present disclosure. Although the present disclosure has been illustrated in detail with reference to the foregoing embodiments, those skilled in the art should understand that they may still make modifications to the technical solutions described in the foregoing embodiments or equivalently substitute some or all technical features thereof. However, these modifications or substitutions do not make the essence of the corresponding technical solutions depart from the scope of the technical solutions of the embodiments of the present disclosure.

What is claimed is:

1. A voice skill game editing method, applied in a voice skill game editing apparatus, comprising:
   displaying a plurality of node elements having a hierarchical relationship and a cascading element for connecting a parent node and a child node in a node editing area of a user editing interface;
   acquiring voice scenario information configured by a user for the node elements in an element configuration area of the node elements when it is determined that the node elements are in an active state;
   acquiring voice skill control information configured by the user for the cascading element in an element configuration area of the cascading element when it is determined that the cascading element is in an active state; and
   determining, according to the hierarchical relationship corresponding to the node elements and the voice skill control information configured for the cascading element, game logic between the voice scenario information to obtain a voice skill game;
   wherein the method further comprises:
   displaying a resource management control to the user in a resource management operation interface; and
   batch receiving, batch deleting, or batch modifying a game design resource according to an operation of the user on the resource management control, wherein the game design resource comprises at least one of: a picture resource, a text resource, an audio resource and an animation resource.

2. The method according to claim 1, wherein the voice scenario information comprises: voice resource information and voice input control information, wherein a semantic corresponding to the voice resource information is a scenario content of the node elements; and
   the acquiring voice scenario information configured by a user for the node elements in an element configuration area of the node elements when it is determined that the node elements are in an active state comprises:
displaying a control for configuring the voice resource information and a control for configuring the voice input control information in the element configuration area of the node elements when it is determined that the node elements are in the active state; and
acquiring the voice resource information and the voice input control information configured for the node elements that are in the active state according to operations of the user on the control for configuring the voice resource information and the control for configuring the voice input control information.

3. The method according to claim 1, wherein the voice skill control information comprises: a voice triggering rule, a child node hand over determining rule and a virtual character attribute updating rule;
the acquiring voice skill control information configured by the user for the cascading element in an element configuration area of the cascading element when it is determined that the cascading element is in an active state comprises:
displaying a control for configuring the voice triggering rule, a control for configuring the child node hand over determining rule and a control for configuring the virtual character attribute updating rule, which are preset for the cascading element, in the element configuration area of the cascading element when it is determined that the cascading element is in the active state, wherein a processing result of the voice triggering rule is trigger information of the child node hand over determining rule, and a processing result of the child node hand over determining rule is trigger information of the virtual character attribute updating rule; and
acquiring the voice triggering rule, the child node hand over determining rule and the virtual character attribute updating rule configured for the cascading element that is in the active state, respectively, according to operations of the user on the control for configuring the voice triggering rule, the control for configuring the child node hand over determining rule, and the control for configuring the virtual character attribute updating rule.

4. The method according to claim 1, wherein, before the displaying a plurality of node elements having a hierarchical relationship and a cascading element for connecting a parent node and a child node in a node editing area of a user editing interface, the method further comprises:
displaying a node element as a root node in the node editing area; and
generating under the node element as the root node a new node element taking the root node as a parent node, and a cascading element connecting the node element as the root node and the new node element, according to a node expansion operation input by the user to the node element as the root node, so as to form the hierarchical relationship between the node elements.

5. The method according to claim 1, wherein, after the displaying a plurality of node elements having a hierarchical relationship and a cascading element for connecting a parent node and a child node in a node editing area of a user editing interface, the method further comprises:
generating under a node element corresponding to a node expansion operation input by the user a new node element taking the node element corresponding to the node expansion operation as a parent node, and a cascading element connecting the node element corresponding to the node expansion operation and the new node element, according to the node expansion operation; and
deleting a node element corresponding to a node deletion operation input by the user, and all node elements and cascading elements in all hierarchies under the deleted node element, according to the node deletion operation.

6. The method according to claim 1, wherein, after the displaying a plurality of node elements having a hierarchical relationship and a cascading element for connecting a parent node and a child node in a node editing area of a user editing interface, the method further comprises:
generating a new node element between at least two node elements corresponding to a node insertion operation input by the user, and cascading elements connecting the at least two node elements and the new node element, according to the node insertion operation, wherein the new node element is an intermediate node in a node branch comprising the at least two node elements.

7. The method according to claim 3, wherein the node editing area further comprises an initial state element, and before the acquiring voice skill control information configured by the user for the cascading element in an element configuration area of the cascading element when it is determined that the cascading element is in an active state, the method further comprises:
acquiring virtual character attribute information configured by the user for the initial state element in an element configuration area of the initial state element when it is determined that the cascading element is in the active state; and
before the acquiring voice skill control information configured by the user for the cascading element in an element configuration area of the cascading element when it is determined that the cascading element is in an active state, the method further comprises:
determining the control for configuring the child node hand over determining rule, and the control for configuring the virtual character attribute updating rule, according to the virtual character attribute information configured for the initial state element.

8. The method according to claim 3, wherein the control for configuring the voice triggering rule is associated with an output interface of a preset natural language processing model, and an input interface of the natural voice processing model is associated with a preset game language input interface, and
the acquiring the voice triggering rule configured for the cascading element that is in the active state according to an operation of the user on the control for configuring the voice triggering rule comprises:
acquiring password information according to the operation of the user on the control for configuring the voice triggering rule; and
acquiring the voice triggering rule configured for the cascading element that is in the active state according to the password information, wherein the voice triggering rule defines: comparing the password information with an output content of the natural language processing model, and triggering the child node hand over determining rule when the comparison produces a match.

9. The method according to claim 1, further comprising:
displaying a global information configuration control to the user in a global setting interface; and configuring default information of a game global parameter, or associating a game global configuration item with a default game design resource, according to an operation of the user on the global information configuration control.

10. A non-transitory readable storage medium, storing therein a computer program which, when executed by a processor, is configured to implement the voice skill game editing method according to claim 1.

11. A voice skill game editing apparatus, comprising: a memory, a processor, and a computer program stored on the memory and operable on the processor, wherein the processor, when running the computer program, is configured to:

display a plurality of node elements having a hierarchical relationship and a cascading element for connecting a parent node and a child node in a node editing area of a user editing interface;

acquire voice scenario information configured by a user for the node elements in an element configuration area of the node elements when it is determined that the node elements are in an active state;

acquire voice skill control information configured by the user for the cascading element in an element configuration area of the cascading element when it is determined that the cascading element is in an active state; and determine, according to the hierarchical relationship corresponding to the node elements and the voice skill control information configured for the cascading element, game logic between the voice scenario information to obtain a voice skill game;

the processor, when running the computer program, is further configured to:

display a resource management control to the user in a resource management operation interface; and batch receive, batch delete, or batch modify a game design resource according to an operation of the user on the resource management control, wherein the game design resource comprises at least one of: a picture resource, a text resource, an audio resource and an animation resource.

\* \* \* \* \*